United States Patent
Zhu et al.

(10) Patent No.: US 10,372,956 B2
(45) Date of Patent: Aug. 6, 2019

(54) AUTOMATIC INFORMATION DISTRIBUTION SYSTEM BETWEEN INDICIA READER SYSTEM AND MOBILE DEVICE

(75) Inventors: Xiaoxun Zhu, Marlton, NJ (US); Ziyang Zhang, Jiangsu (CN)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 328 days.

(21) Appl. No.: 13/501,263

(22) PCT Filed: Oct. 14, 2009

(86) PCT No.: PCT/CN2009/001140
§ 371 (c)(1),
(2), (4) Date: Jun. 21, 2012

(87) PCT Pub. No.: WO2011/044712
PCT Pub. Date: Apr. 21, 2011

(65) Prior Publication Data
US 2012/0265623 A1    Oct. 18, 2012

(51) Int. Cl.
G06Q 20/00    (2012.01)
G06K 7/10    (2006.01)
G06Q 30/06    (2012.01)

(52) U.S. Cl.
CPC .......... G06K 7/1095 (2013.01); G06Q 30/06 (2013.01)

(58) Field of Classification Search
CPC ... H04L 67/125; H04L 67/06; H04M 2203/10
USPC .......................... 235/379, 380; 705/16, 26, 34
See application file for complete search history.

(56) References Cited

U.S. PATENT DOCUMENTS

| | | | |
|---|---|---|---|
| 7,948,925 B2 | 5/2011 | Miyabayashi et al. | |
| 8,027,667 B2 | 9/2011 | Mechaley, Jr. | |
| 8,565,131 B2 | 10/2013 | Miyabayashi et al. | |
| 2004/0203354 A1* | 10/2004 | Yue ...................... | H04W 88/04 455/41.1 |
| 2004/0203384 A1 | 10/2004 | Sugikawa et al. | |
| 2006/0116160 A1* | 6/2006 | Fuccello ............... | H04W 48/16 455/556.1 |
| 2006/0135064 A1* | 6/2006 | Cho .................... | H04M 1/7253 455/41.1 |
| 2008/0051031 A1 | 2/2008 | Itoh et al. | |
| 2008/0320587 A1 | 12/2008 | Vauclair et al. | |

(Continued)

FOREIGN PATENT DOCUMENTS

CN    1227866 C    11/2005
CN    101015173 A    8/2007

(Continued)

OTHER PUBLICATIONS

SIPO (ISA/CN), International Search Report from corresponding PCT Application No. PCT/CN2009/001140, completed on Jun. 26, 2010 (dated Jul. 15, 2010), 5 pages.

(Continued)

*Primary Examiner* — Rokib Masud
(74) *Attorney, Agent, or Firm* — Addition, Higgins & Pendleton, P.A.

(57) ABSTRACT

Provided is a method for doing business, which comprises the steps of providing an indicia reader at a point of transaction (POT), capturing a digital image with the indicia reader at the POT and archiving the digital image.

24 Claims, 5 Drawing Sheets

(56) References Cited

U.S. PATENT DOCUMENTS

| | | |
|---|---|---|
| 2009/0227282 A1 | 9/2009 | Miyabayashi et al. |
| 2010/0012715 A1* | 1/2010 | Williams ............... G06Q 20/32 235/375 |
| 2011/0205944 A1 | 8/2011 | Miyabayashi et al. |

FOREIGN PATENT DOCUMENTS

| | | |
|---|---|---|
| CN | 101444115 A | 5/2009 |
| JP | 2002024114 A | 1/2002 |
| JP | 2002149773 A | 5/2002 |
| JP | 2006121624 A | 5/2006 |
| JP | 2006121726 A | 5/2006 |
| JP | 2006345573 A | 12/2006 |
| JP | 2008228271 A | 9/2008 |
| JP | 2009071664 A | 4/2009 |
| JP | 2009190668 A | 8/2009 |
| JP | 2009218845 A | 9/2009 |
| JP | 2013507700 A | 3/2013 |
| KR | 1020080064539 A | 7/2008 |
| WO | 2004105324 A1 | 12/2004 |
| WO | WO02007117 A2 | 11/2005 |
| WO | 2008003000 A2 | 1/2008 |
| WO | WO2008003000 A2 | 1/2008 |
| WO | 2009088942 A1 | 7/2009 |

OTHER PUBLICATIONS

First Chinese Office Action in Patent Application No. 200980152880.X (Filed Oct. 14, 2009), dated Aug. 8, 2014, English Translation Provided, 28 pages.

Japanese Office Action for Application No. 2012-533449 (JP2013-507700 A), dated Jun. 2, 2014, including English Translation 6 pages.

Japanese Final Decision of Rejection in Application No. 2012-533449, dated Jan. 28, 2015, 8 pages (English Translation included).

Third Office Action in related Chinese Application No. 200980162880.X dated Sep. 14, 2015, English Translation provided, 24 pages.

Report of Re-examination before Appeal in related Japanese Application No. 2012-533449, dated Aug. 3, 2015, English Translation provided, 7 pages.

Reason for Rejection, dated Jan. 5, 2016, issued in related Japanese Application No. 2012-533449, English translation provided, 34 total pages. (New references only have been included on this IDS; JP2006121726 was previously cited).

Japanese Fourth Office Action in related JP Application No. 2012-533449, dated May 16, 2016, 71 pages, Translation provided.

* cited by examiner

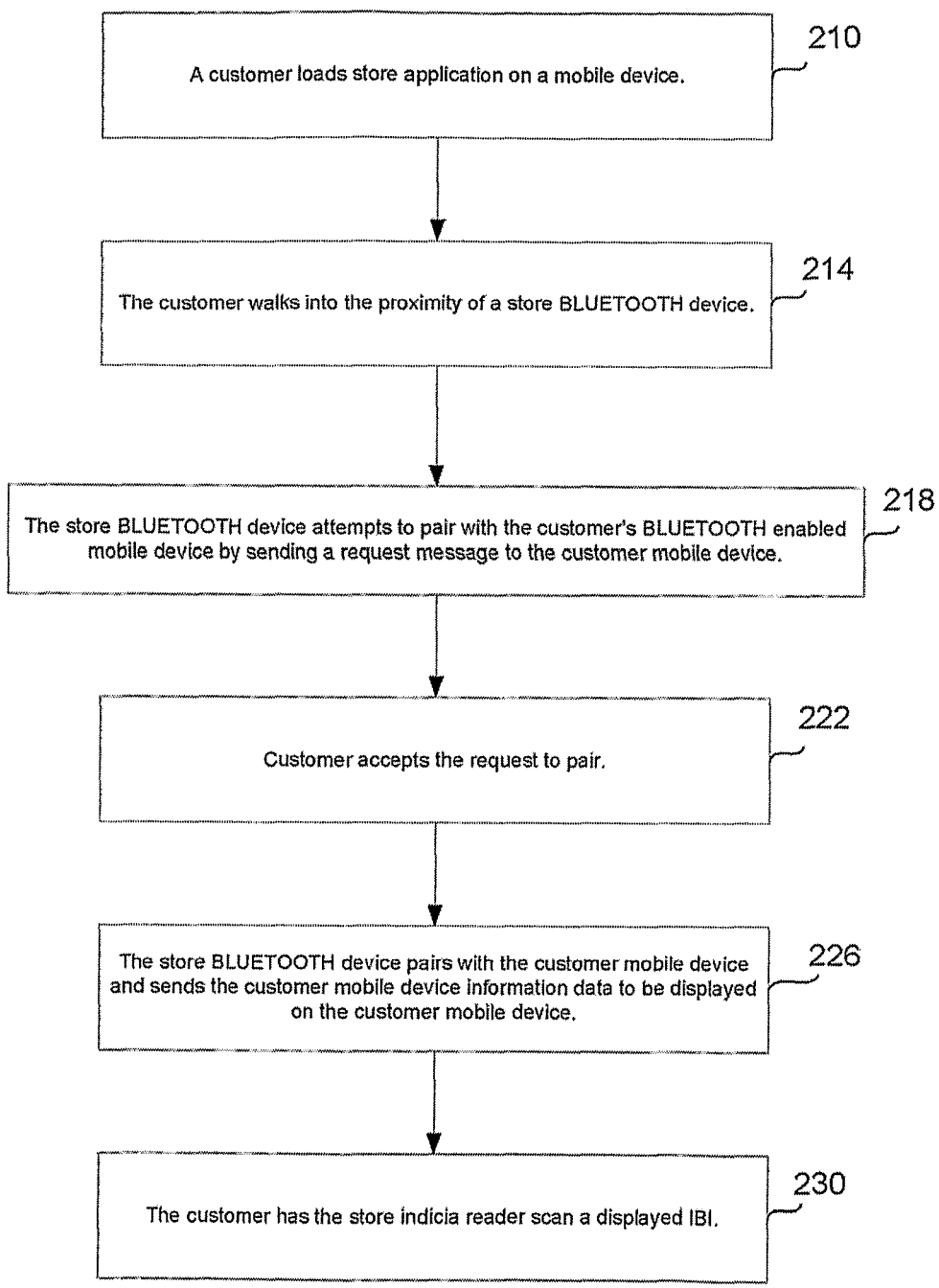

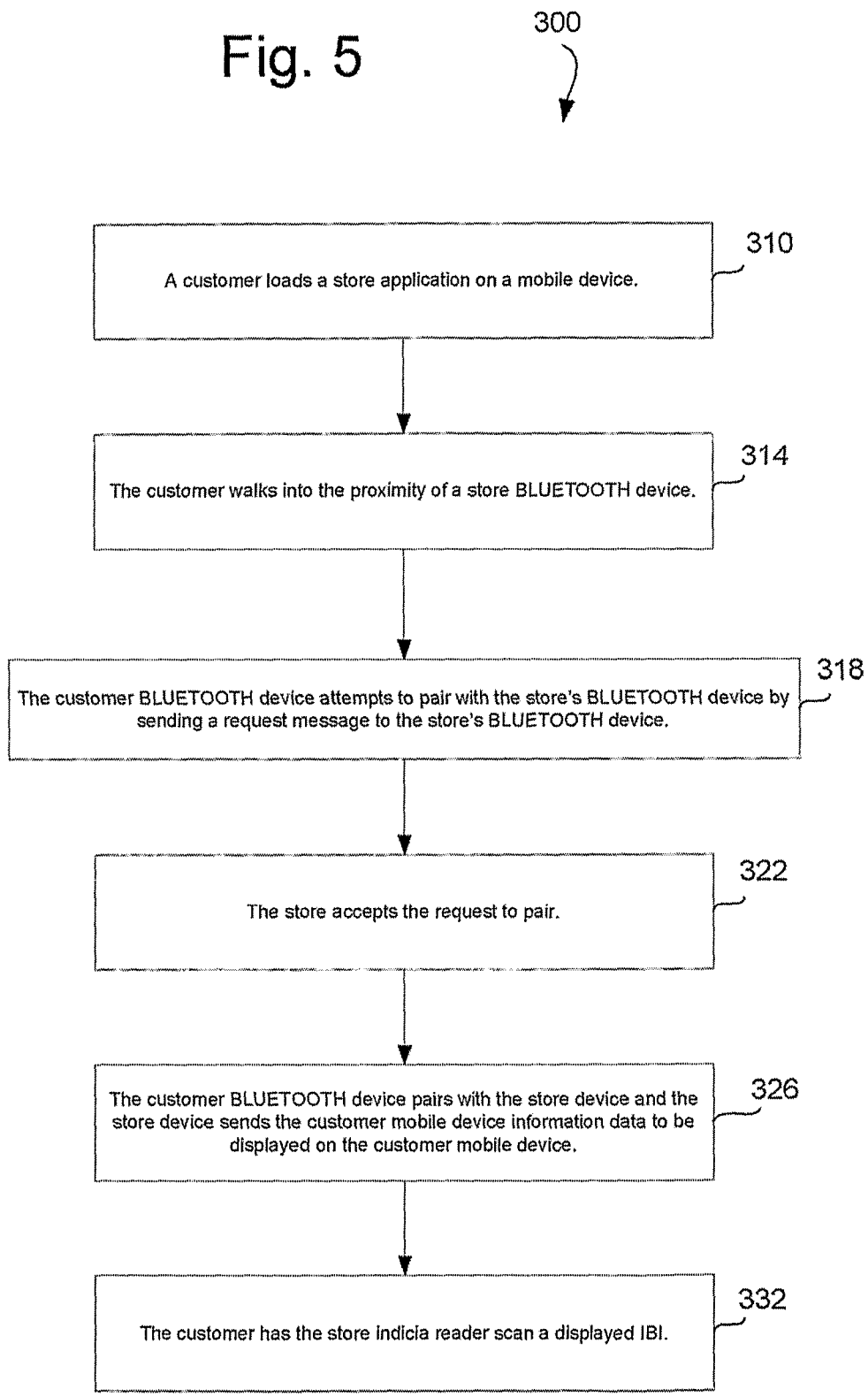

AUTOMATIC INFORMATION DISTRIBUTION SYSTEM BETWEEN INDICIA READER SYSTEM AND MOBILE DEVICE

FIELD OF THE INVENTION

The present invention relates to mobile devices, and more particularly to a point of transaction system useful for information distribution.

BACKGROUND

Indicia reading devices (also referred to as readers, readers, etc.) typically read data represented by printed information bearing indicia (IBI), (also referred to as symbols, symbology, bar codes, etc.) at a point of transaction POT. For instance, one type of a symbol is an array of rectangular bars and spaces that are arranged in a specific way to represent elements of data in machine readable form. Optical indicia reading devices typically transmit light onto a symbol and receive light scattered and/or reflected back from a bar code symbol or indicia. The received light is interpreted by an image processor to extract the data represented by the symbol. Laser indicia reading devices typically utilize transmitted laser light.

Often times a bar code reader may be portable and wireless in nature thereby providing added flexibility. In these circumstances, such portable bar code readers form part of a wireless network in which data collected within the terminals is communicated to a host computer situated on a hardwired backbone via a wireless link. For example, the portable bar code readers may include a radio or optical transceiver for communicating with a network computer.

Conventionally, an indicia reader, whether portable or otherwise, may include a central processor which directly controls the operations of the various electrical components housed within the bar code reader. For example, the central processor controls detection of keyboard entries, display features, wireless communication functions, trigger detection, and bar code read and decode functionality.

Efforts regarding such systems have led to continuing developments to improve their versatility, practicality and efficiency.

BRIEF DESCRIPTION OF THE DRAWINGS

FIG. 4 is an exemplary flowchart for completing a transaction.

FIG. 5 is an exemplary flowchart for completing a transaction.

DETAILED DESCRIPTION

Figure 1:
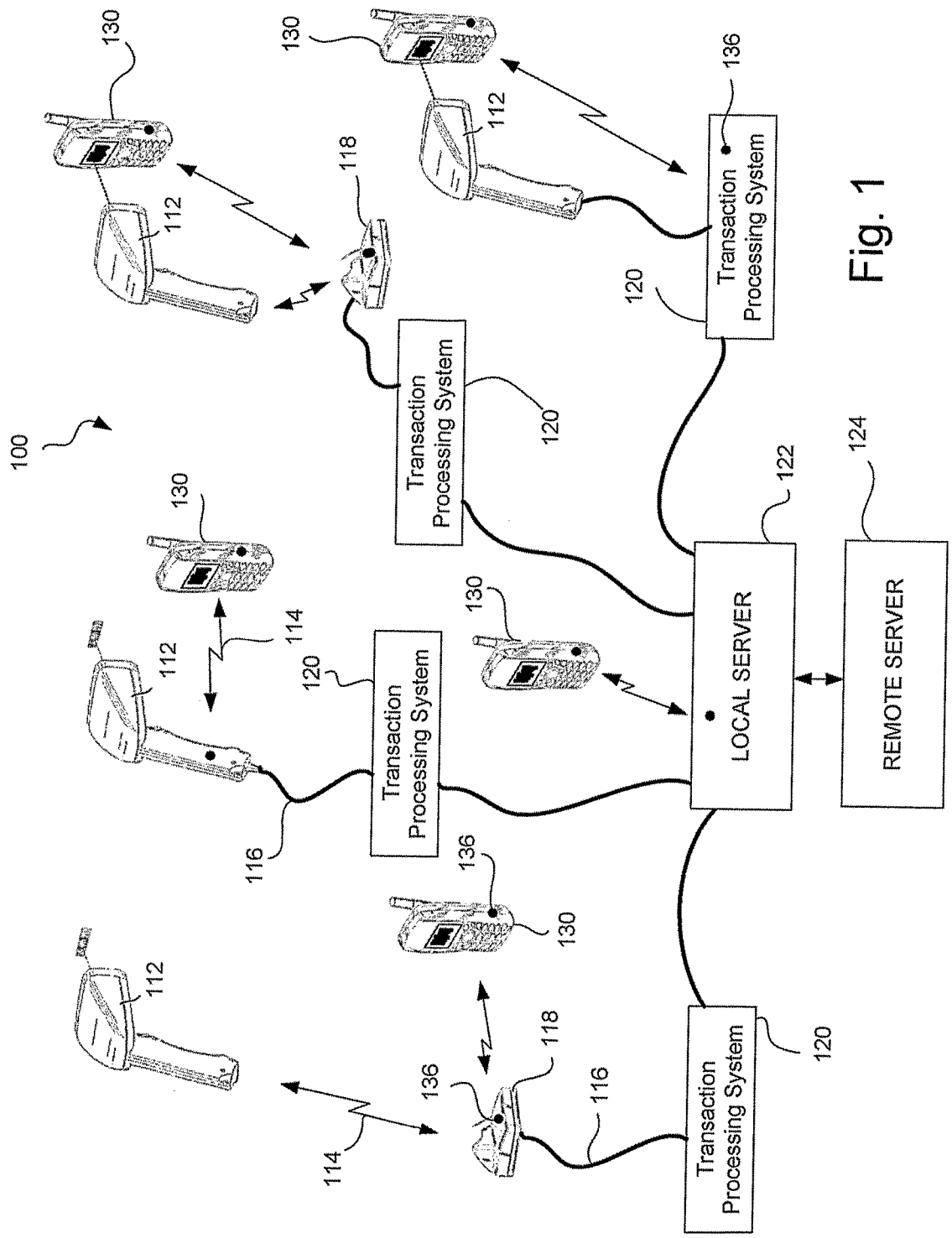
FIG. 1 is a block schematic diagram of an exemplary transaction system.

Reference will now be made to exemplary embodiments which are illustrated in the accompanying drawings. The claimed system, however, may be embodied in various forms and should not be construed as limited to the embodiments set forth herein. Rather, these representative embodiments are described in detail so that this disclosure will be thorough and complete, and will fully convey the scope, structure, operation, functionality, and potential of applicability of the invention to those skilled in the art. Wherever possible, the same reference numbers will be used throughout the drawings to refer to the same or like parts. The term "scan" or "scanning" use herein refers to reading or extracting data from an information bearing indicia or symbol.

An exemplary scanning system which may be used as part of the present store or establishment environment may provide certain benefits, such as a decoding function that provides the capability to retrieve or read data omnidirectionally from machine readable indicia or symbols. Indicia to be read may take many forms, such as OCR of text, 2D symbology, 1D symbology, stacked linear symbology, matrix codes, optical marks, trademarks, identification graphics (state, country, company, etc.), pattern recognition, etc.

An exemplary use of the exemplary scanning system is as part of a retail establishment transaction system. A transaction may be any of a number of events that occur between a customer and an establishment, such as a store. The events may involve such things as exchange of information between the establishment and a customer or establishment employee. The information may be such things as sales information, advertisements, coupons, exchange of monetary funds, payment for merchandise or service, return of merchandise, picking up merchandise that has already been paid for, contracting for a service (such as leasing or renting), etc.

An exemplary transaction system comprises a customer entering an establishment carrying on his/her person a mobile device equipped with a wireless communication system, such as a BLUETOOTH, Near Field Communication (NFC) or other module. BLUETOOTH and NFC are open wireless layered protocol for exchanging data over relatively short distances from fixed and mobile devices, thereby creating personal area networks (PANs). Near Field Communication or NFC, is a short-range high frequency wireless communication technology which enables the exchange of data between devices over about a 10 centimeters (around 4 inches) distance. A master BLUETOOTH device can communicate with up to seven devices in a Wireless User Group. This network group of up to eight devices is called a piconet.

BLUETOOTH device may transmit such as device name, device class, a list of services, device features, manufacturer, BLUETOOTH specification used, clock offset and other information on demand.

A BLUETOOTH device may perform an inquiry to find other devices to connect to, and other devices may be configured to respond to such inquiries. If the device trying to connect knows the address of the device, it may respond to direct connection requests and transmit the information. Use of a device's services may require pairing or acceptance by its owner, but the connection itself may be initiated by any device and held until it goes out of range. Some devices may be connected to only one device at a time, and connecting to them prevents them from connecting to other devices and appearing in inquiries until they disconnect from the other device.

Every device has a unique address which is generally not shown in inquiries. Friendly BLUETOOTH names may be used, which may be set by a user. This name appears when another user scans for devices and lists of paired devices. Most mobile devices have the BLUETOOTH name set to the manufacturer and model of the phone by default. Most phones and laptops show only the BLUETOOTH names and special programs may be used to get additional information from remote devices.

Pairs of devices may establish a relationship by creating a shared secret known as a link key in a process known as pairing. If a link key is stored by both devices they are said to be bonded. A device that wants to communicate only with a bonded device can cryptographically authenticate the identity of the other device, and so be sure that it is the same device it previously paired with. Once a link key has been generated, an authenticated ACL link between the devices may be encrypted so that the data that they exchange over the airwaves is protected against eavesdropping. Link keys may be deleted at any time by either device, if done by either device this will implicitly remove the bonding between the devices, so it is possible one of the device to have a link key stored but not be aware that it is no longer bonded to the device associated with the given link key.

BLUETOOTH services may require either encryption or authentication, as such require pairing before they allow a remote device to use the given service. Some services, such as an Object Push Profile, elect not to explicitly require authentication or encryption so that pairing does not interfere with the user experience associated with the service use-cases.

An exemplary pairing mechanism or protocol is Legacy pairing wherein each device must enter a PIN code and pairing is only successful if both devices enter the same PIN code.

Another exemplary pairing mechanism or protocol is Secure Simple pairing which uses a form of public key cryptography wherein no user interaction is required but a device may prompt the user to confirm the pairing process.

Another exemplary pairing mechanism or protocol is Numeric comparison wherein both devices have a display and at least one can accept a binary Yes/No user input. This pairing method displays a numeric code on each device. The user should compare the numbers to ensure they are identical. If the comparison succeeds, the user(s) may confirm pairing on the device(s) that can accept an input.

Another exemplary pairing mechanism or protocol is Passkey Entry used between a device with a display and a device with numeric keypad entry (such as a keyboard), or two devices with numeric keypad entry. In the first case, the display is used to show a numeric code to the user, who then enters the code on the keypad. In the second case, the user of each device enters the same number.

Another exemplary pairing mechanism or protocol is Out of band (OOB) which uses an external means of communication (such as NFC) to exchange some information used in the pairing process. Pairing is completed using the BLUETOOTH radio, but requires information from the OOB mechanism.

In an exemplary business environment embodiment an establishment has one or more wireless communication systems which sends a query or message to a customer mobile device requesting to establish a wireless communication link between the two. The customer would be alerted to this query (by visual, audible or tactile indicator) and decide whether to establish the link or not. The customer may pair the mobile device communication device with the establishment communication device by accepting the request in an affirmative manner, such as by keying in on the mobile device a command to send to the establishment wireless system an affirmation signal. The command may be in the manner of a password, code, keystroke, button, etc. The process of activating BLUETOOTH on both sides, searching, waiting, pairing and authorization may by a simple "touch" of the mobile phones. Once the establishment device and the customer mobile device are paired, an exemplary exchange of information between the establishment and a customer event may involve the establishment wirelessly sending the customer a data packet or message information. The data information may be an image in the form of a coupon, sales event, information bearing indicia (IBI) such as a barcode, receipts, sales brochures, advertisement, items for sale and the location of said items, etc.

In an exemplary embodiment, the establishment may also send authentication data to the customer for utilization as an authentication process when the information is displayed at a point of transaction (POT) The authentication data may be in the form in an IBI. The customer displays the IBI at the POT to an indicia reader which is read by the establishment to complete the transaction at the POT where goods or services are exchanged.

In an exemplary embodiment software resides on the base or cradle of an indicia reader at a POT terminal to which the cradle is associated or connected. The software is responsible for retrieving from an establishment database appropriate information for the particular customer detected. The appropriate information may be a an image of a coupon having an IBI provided therein. For a given exemplary transaction, the software may keep track of all the coupons that were sent to and received by the customer. If coupons are read (such as by scanning an IBI in the transmitted image) during the given transaction, the software matches the information read with the sent coupons to identified those coupons as confirmed hits or numbers of usage. At the end of the transaction, the software may deliver the list of confirmed hits to the indicia reader manufacturer or other provider as the basis for a pay-per-hit service charge to the establishment using the reader and software.

An exemplary information exchange system may be comprised of a BLUETOOTH dongle or cradle connected to the POT terminal that can establish a wireless link with the customer's personal mobile wireless device and a software algorithm running on the POT terminal that: a) sends a coupon image to the customer's wireless device; b) keeps a list of the coupons scanned during the customer's entire transaction and c) matches the coupons sent and coupons scanned and archives a list of coupons that are confirmed to have been sent to, and received by the customer and a list of coupons that are sent to the customer as well as used by the customer at the POT. The statistics collected by the software algorithm may be used by a third party to charge the establishment sending the coupon on a per transmission or per scan basis.

In an exemplary system, a plurality of customer mobile devices may be found automatically rather than the establishment communication device looking for mobile devices by their respective IDs one by one. This facilitates wireless transmission of information to many customer mobile devices simultaneously or nearly simultaneously.

In an exemplary embodiment all mobile device IDs are registered in the establishment server to facilitate automatic pairing of the establishment software application once the establishment wireless device matches registered IDs. Searching and pairing may be attempted continuously or at predetermined intervals.

In an exemplary embodiment, an indicia reader, indicia reader base or cradle, POT computer, or other system with a BLUETOOTH device transmits a request to a mobile device BLUETOOTH to initiate a connection. Once the request is made, a personal identification number (PIN) code message screen is displayed on the customer mobile device to permit the customer to input the appropriate PIN.

Automatic pairing between the two BLUETOOTH devices may be preferable so that a customer needn't participate to receive information from the establishment. In an exemplary embodiment, the customer may need only to install a software application on his/her mobile device that facilitates automatic pairing. The application need not support other BLUETOOTH applications or devices.

In an exemplary embodiment, application software may be running on the customer mobile device that first identifies a store or establishment's BLUETOOTH system which may be disposed on an indicia reader, indicia reader base or cradle, POT PC, or other system that is eligible to pair with. For example the software looks at the store device BLUETOOTH address to see if it matches with the pre-assigned BLUETOOTH (media access control) MAC address blocks or the device's names head of the BLUETOOTH address of the customer mobile device. If the match is found, the software sets the customer mobile device PIN code to match the default PIN code of the store BLUETOOTH device to pair the two devices. A visible ID (for example the last 4 digits of the BLUETOOTH cradle's MAC address) may be displayed on the BLUETOOTH cradle, indicia reader, the POT counter in front of the user or other display. The user may match that cradle ID to a list of devices displayed on the phone to select the correct cradle that is in front of the user. Alternatively, the cradle ID may be manually input into the application if not already listed on the application display. The application then initiates a BLUETOOTH connection with the BLUETOOTH cradle, using a passcode that is previously agreed upon, preferably based on the BLUETOOTH cradle's visible ID number. The cradle will authenticate the phone's request and establish a connection with the phone. To improve security, the passcode may also be generated at run time by the BLUETOOTH cradle or the POT terminal, and can either be obtained from the store employee or displayed on a POT display that is visible to the user.

The established wireless connection may be used for exchanging files between the POT system and the mobile device, such as coupon images, receipt text, information bearing indicia, user instructions etc.

In an exemplary embodiment, the customer mobile devices runs an application that displays an indicia identifying the customer or its mobile device (e.g. preferred customer number), which the customer presents at the POT. The POT optical reader captures this information, which either contains the wireless connection information (MAC, passcode, etc.), or may be used to look up such information that is pre-stored in the establishment server. The POT optical reader of reader cradle then uses this to establish the wireless connection with the customer mobile device.

Figure 2:
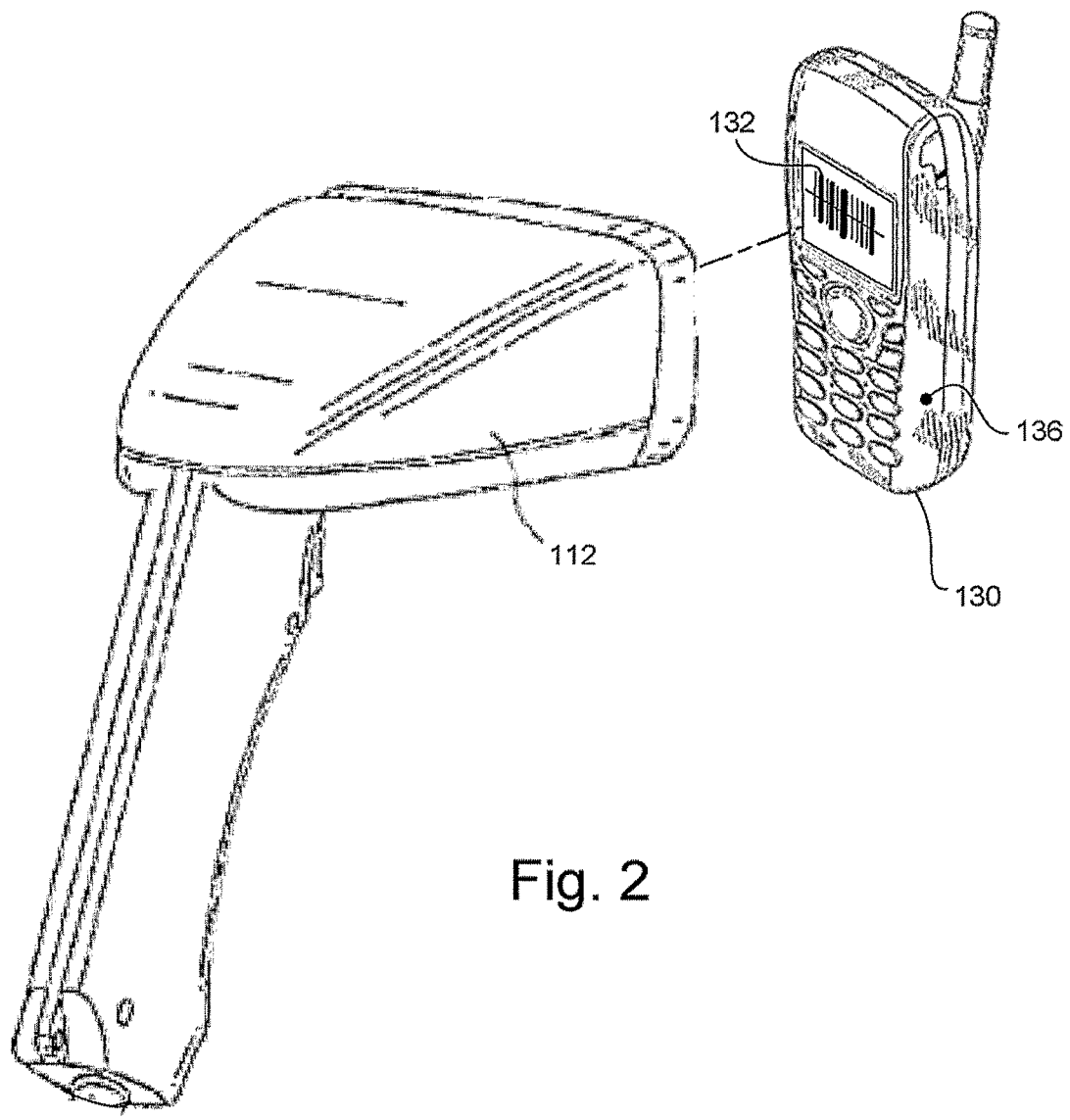
FIG. 2 is a perspective view of an exemplary indicia reader reading an image displayed on a mobile device.

FIGS. 1 and 2 illustrate an exemplary transaction system 100 configuration wherein a plurality of indicia readers 112 are being operated or utilized in an establishment, such as a retail store. At least one indicia reader may be in communication (wired 114 or wireless 116) with a local transaction processing system 120, such as cash register either directly or through a base or cradle 118. At least one indicia reader may be in wireless communication with a respective base or cradle wherein the base or cradle may be in communication (wired or wireless) with a local server 122, which may be in communication (wired or wireless) with a remote server 124. Establishments typically have a plurality of indicia readers located in an area of proximity. One or more mobile devices 130 may be in wireless communication with a base 118, an indicia reader 112, transaction processing system 120 and/or local server 122. An exemplary wireless communication system for communication between devices or systems is BLUETOOTH module technology represented by modules 136 disposed either internally or externally.

Figure 3:
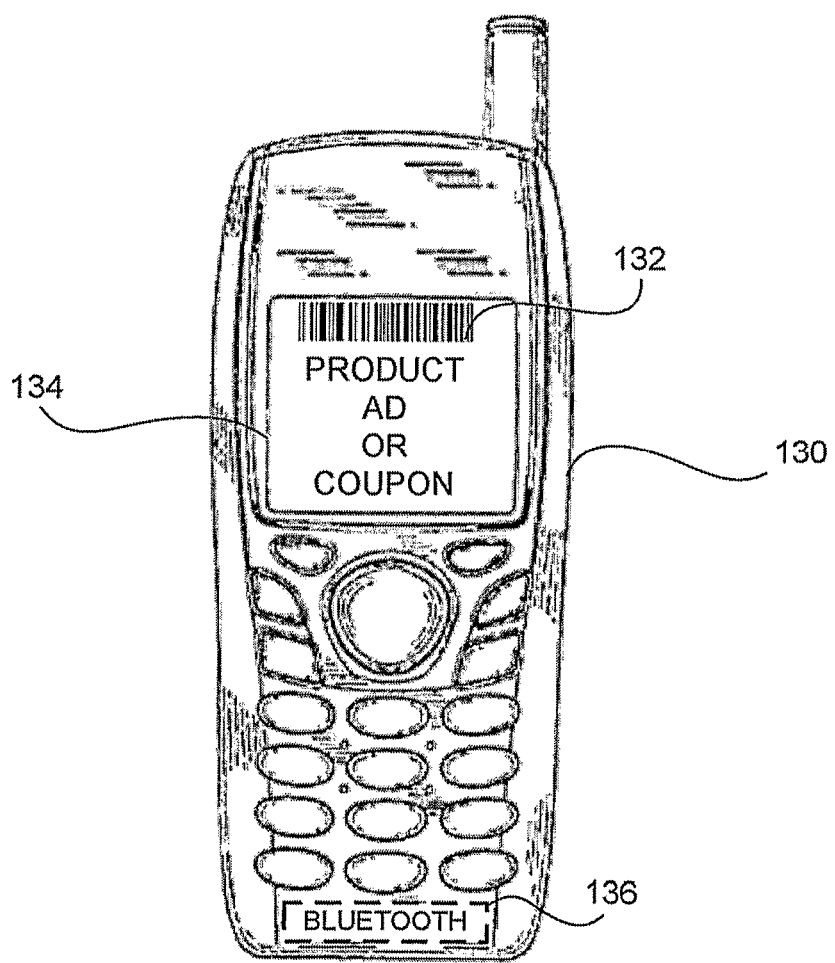
FIG. 3 is an illustration of a mobile device displaying an image containing an information bearing indicia.

FIG. 3 illustrates an exemplary image 130 displayed on an exemplary display 132, such as may be disposed on a mobile platform or device 130 such as mobile phone, portable data terminal (PDT), personal digital assistant (PDA), etc. A Portable Data Terminal, or PDT, is typically an electronic device that is used to enter or retrieve data via wireless transmission device or transceiver 136 (WLAN, WWAN, BLUETOOTH, NFC, etc.) to access a database from a remote location. Personal Digital Assistants (PDAs) are handheld devices typically used as a personal organizer, and may have many uses such as calculating, use as a clock and calendar, playing computer games, accessing the Internet, sending and receiving E-mails, use as a radio or stereo, video recording, recording notes, use as an address book, and use as a spreadsheet. The displayed data information image received from the establishment may contain information, pictures, coupon images, receipt text, information bearing indicia, user instructions, ads, etc. BLUETOOTH and NFC are open wireless layered protocol for exchanging data over relatively short distances from fixed and mobile devices, thereby creating personal area networks (PANs). Near Field Communication or NFC, is a short-range high frequency wireless communication technology which enables the exchange of data between devices over about a 10 centimeters (around 4 inches) distance. A master BLUETOOTH device may communicate with multiple devices in a Wireless User Group.

FIG. 4 illustrates an exemplary sequence for completing a transaction comprising a customer loading store application on a mobile device in a step 210. The customer enters an establishment carrying on his/her person a mobile device equipped with a wireless communication system, such as a BLUETOOTH, Near Field Communication (NFC) or other communication module and transports it within the communication range of the store communication system in a step 214. The store BLUETOOTH device then attempts to pair with the customer's BLUETOOTH enabled mobile device by sending a request message to the customer mobile device in a step 218. The Customer then accepts the request to pair in a step 222. The store BLUETOOTH device then pairs with the customer mobile device and sends the customer mobile device information data to be displayed on the customer mobile device in a step 226. The customer then has the store indicia reader scan a displayed IBI in the information data displayed in a step 230.

FIG. 5 illustrates an exemplary sequence for completing a transaction comprising a customer loading store application on a mobile device in a step 310. The customer enters an establishment carrying on his/her person a mobile device equipped with a wireless communication system, such as a BLUETOOTH, Near Field Communication (NFC) or other communication module and transports it within the communication range of the store communication system in a step 314. The customer BLUETOOTH device then attempts to pair with the store's BLUETOOTH enabled mobile device by sending a request message to the store device in a step 318. The store then accepts the request to pair in a step 322. The customer BLUETOOTH device then pairs with the store BLUETOOTH device and the store sends the customer mobile device information data to be displayed on the customer mobile device in a step 326. The customer then has the store indicia reader scan a displayed IBI in the information data displayed in a step 330.

An exemplary use of a scanning system is as the primary or sole indicia reader at a customer POT in an establishment. Primary may mean the indicia reader at a POT is used to scan or image items more often than any other indicia reader or imager at the POT. Completion of a transaction may be any of a number of events that occur between a customer and an establishment, such as a store. The events may involve such things as exchange of information (image or otherwise) between the establishment and a customer or establishment employee, exchange of monetary funds, payment for merchandise or service, return of merchandise, picking up merchandise that has already been paid for, or contracting for a service (such as leasing or renting). As a primary indicia reader, merchandise or a displayed image with indicia may be read or scanned by it so that data decoded therefrom may be used for a stock keeping system (such as SKU) functionality such as sales, price look up, inventory, etc.

A picture may also be taken (or image captured) by the primary indicia reader at the POT for archival purposes, allowing the establishment to reference the picture or image at the time of the transaction or for the picture to be archived for use at a later time. For example, archiving may be for meeting statutory requirements, future identification, process compliance, fraud prevention, liability risk mitigation, forms completion, etc. An exemplary sequence at a POT may be for an employee to scan indicia from one or more items presented at the POT, and then take one or more pictures or images. The picture taken may be any of a number of items, such as a picture of the customer or an information bearing instrument or medium such as a customer presents one or more information bearing medium, which may be such things as personal checks or other items with signatures or identification instruments such as a credit card, boarding pass, flight ticket, employee badge, etc., or government identification instruments such as a driver's license, passport, military card, doctor's prescription Rx, etc.

Information read from the picture taken may be used to electronically complete various types of forms, such as credit applications, statutorily required forms such as gaming licenses and firearm applications, photograph film development forms, rebate forms, merchandise lay away forms, extended warranty forms, etc. The process of extracting the information from the picture might include OCR, 2D barcode decoder such as PDF417 decoder, or matrix decoder such as Datamatrix, Aztec, QR code decoder, etc. To this end, a picture may be taken of the signature of the customer and archived or used for comparison with signatures which are already on file or stored. In another example, the indicia reader might read the applicants address from the PDF417 bar code on the drivers license and upon recognizing that the field being read is the applicants address, the system would then populate the address portion of the drivers license form automatically onto another application, such as an application or form for a hunting license, fishing license, firearms license, employment application, credit application, etc. Similarly the applicants date of birth, sex, and eye color could be filled in. Such a system would be more convenient while at the same time reducing application time and reducing application error rate because of incorrectly transcribed information. At the same time the indicia reader could be automatically changed to a picture taking mode, signal the operator to aim the indicia reader at the applicant, the drivers license, an article for purchase or rent, etc. and then take a picture. This picture could then also be automatically added to or associated with the electronic application being prepared. Part of the process might be allowing the applicant to look at the photo and accepting that the image is acceptable. If the appearance of the image is not acceptable, then a second alternate image might be taken and the process repeated until an image is taken that the applicant finds to be acceptable.

It is to be noted that the present indicia reader effectively turns every POT into a potential customer service counter where transactions may involve coupon redemption, return of merchandise, application completion, information dispersion, etc. with the reader being the primary indicia reader.

It should be understood that the programs, processes, methods and apparatus described herein are not related or limited to any particular type of computer or network apparatus (hardware or software). Various types of general purpose or specialized computer apparatus may be used with or perform operations in accordance with the teachings described herein. While various elements of the preferred embodiments have been described as being implemented in software, in other embodiments hardware or firmware implementations may alternatively be used, and vice-versa. The illustrated embodiments are exemplary only, and should not be taken as limiting the scope of the present invention. For example, the steps of the flow diagrams may be taken in sequences other than those described, and more, fewer or other elements may be used in the block diagrams. Also, unless applicants have expressly disavowed any subject matter within this application, no particular embodiment or subject matter is considered to be disavowed herein.

The invention claimed is:

1. A method of completing a transaction, the method comprising:
    upon at least a first instance of a mobile device moving within a communication range of an establishment communication device, automatically authenticating an establishment software application residing on the mobile device;
    upon said authenticating, wirelessly transmitting, from the establishment communication device, a request to pair with the mobile device via said establishment software application;
    receiving, at the establishment communication device, an acceptance of the request to pair;
    responsive to receiving the acceptance, automatically and wirelessly pairing the establishment communication device with the mobile device utilizing a pairing protocol;
    responsive to the automatic and wireless pairing of the establishment communication device with the mobile communication device, wirelessly transmitting information data from the establishment communication device to the mobile communication device.

2. A method of completing a transaction in accordance with claim 1, wherein the pairing protocol comprises at least one of the following: Legacy pairing; Secure Simple pairing; Numeric comparison; Passkey Entry; and Out of band.

3. A method of completing a transaction in accordance with claim 1, wherein the accepting comprises at least one of the following: password entry; code entry; keystroke entry; and button entry.

4. A method of completing a transaction in accordance with claim 1, further comprising archiving information regarding the information data content.

5. A method of completing a transaction in accordance with claim 1, further comprising archiving a list of information that was transmitted and read.

6. A method of completing a transaction in accordance with claim 1, wherein the indicia reader is disposed in the establishment communication.

7. A method of completing a transaction in accordance with claim 1, wherein the establishment communication device is disposed on a wireless indicia reader base.

8. A method according to claim 1, further comprising:
displaying, as information bearing indicia, on a display disposed on the mobile device, the content of the information data;
reading the information bearing indicia on the display with an indicia reader at a point of transaction; and
at the point of transaction, transmitting the information data content from the indicia reader to an establishment transaction device wherein the establishment transaction device utilizes the information data content when completing a transaction.

9. A method according to claim 1, wherein the establishment communication device is an establishment server.

10. A method according to claim 9, further comprising registering identification information of the mobile device with the establishment server prior to the automatic and wireless pairing of the mobile device and the establishment server.

11. A method of completing a transaction comprising:
registering, within an establishment server, pairing data associated with a mobile communication device storing an establishment software application;
automatically and wirelessly pairing the establishment server with the mobile communication device via the establishment software application upon the mobile device moving within the communication range of the establishment server;
responsive to automatically and wirelessly pairing the establishment server with the mobile communication device, wirelessly transmitting information data from the establishment server to the mobile communication device.

12. A method of completing a transaction in accordance with claim 11, further comprising archiving information regarding using the information data content when completing the transaction.

13. A method of completing a transaction in accordance with claim 11, further comprising archiving a list of information that was transmitted and read.

14. A method of completing a transaction in accordance with claim 11, wherein the establishment server is in communication with said point of transaction indicia reader.

15. A method of completing a transaction in accordance with claim 11, wherein the establishment server is configured for wired or wireless communication.

16. A method according to claim 11, further comprising:
displaying, on a display disposed on the mobile device, the content of the information data as information bearing indicia;
reading the information bearing indicia with a point of transaction indicia reader; and
using the information data content when completing the transaction with the point of transaction indicia reader.

17. A method according to claim 11, wherein said automatic pairing occurs upon a first instance of the mobile device moving within a communication range of an establishment communication device.

18. A transaction system comprising:
an establishment communication device configured for automatically and wirelessly identifying a mobile communication device upon the mobile communication device moving within the communication range of the establishment communication device,
the system configured to perform a method comprising:
the establishment communication device transmitting at predetermined intervals a request to pair with the mobile communication device;
the establishment communication device and mobile device automatically and wirelessly pairing via an establishment software application stored on the mobile device;
responsive to receiving an acceptance of the request to pair, the establishment communication device wirelessly transmitting information data to the mobile communication device; and
the transaction system using the pairing to complete a transaction.

19. A transaction system in accordance with claim 18, wherein the establishment communication device is located at a point of transaction.

20. A transaction system in accordance with claim 18, wherein the establishment communication device is disposed on an indicia reader.

21. A transaction system in accordance with claim 18, wherein the establishment communication device is disposed on a wireless indicia reader base.

22. A method according to claim 18, wherein said automatic wireless identifying occurs upon a first instance of the mobile device moving within a communication range of an establishment communication device.

23. A system according to claim 18, wherein said establishment communication device is an establishment server configured to continuously search for and pair with a plurality of said mobile devices.

24. A method according to claim 23, wherein said mobile device comprises pairing identification information that is registered with said establishment server prior to the automatic and wireless pairing.

* * * * *